US007541911B2

(12) United States Patent  (10) Patent No.: US 7,541,911 B2
Kawaguchi et al.  (45) Date of Patent: Jun. 2, 2009

(54) RESISTANCE PLATE AND LIQUID LEVEL DETECTION APPARATUS PROVIDED WITH SAID RESISTANCE PLATE

(75) Inventors: Yasunori Kawaguchi, Shimada (JP); Kenichi Tanaka, Shimada (JP); Toshio Oike, Shimada (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 12/041,866

(22) Filed: Mar. 4, 2008

(65) Prior Publication Data

US 2008/0231411 A1  Sep. 25, 2008

(30) Foreign Application Priority Data

Mar. 22, 2007  (JP) ............................. 2007-074938

(51) Int. Cl.
    *H01C 1/14* (2006.01)
(52) U.S. Cl. ..................... 338/330; 338/162; 73/317
(58) Field of Classification Search ......... 338/160–162, 338/330, 327, 328; 73/317, 314, 305
    See application file for complete search history.

(56) References Cited

U.S. PATENT DOCUMENTS 6,369,690 B1 * 4/2002 Chen ........................... 338/160
6,518,873 B1 * 2/2003 O'Regan et al. ............ 338/190
6,588,288 B1 * 7/2003 Swindler .................... 73/866.1

FOREIGN PATENT DOCUMENTS

JP  63-138215 A  6/1988
JP  3833551 B2  7/2006

* cited by examiner

*Primary Examiner*—Kyung Lee
(74) *Attorney, Agent, or Firm*—Sughrue Mion, PLLC

(57) ABSTRACT

In a resistance plate, a first slide portion includes a plurality of first conductive segments arranged at intervals generally in a direction of sliding movement of a sliding arm, the adjacent first conductive segments being connected together via a resistor. A first conducting path 13 extends between the first slide portion and a first end land to electrically connect them together, the first end land being provided for detecting a quantity of electricity appearing according to the positions of the first conductive segment and a second conductive segment which are held in contact with the sliding arm. A protector is formed on the first conducting path to cover this first conducting path. The protector and the resistor are made of the same material.

6 Claims, 6 Drawing Sheets

RESISTANCE PLATE AND LIQUID LEVEL DETECTION APPARATUS PROVIDED WITH SAID RESISTANCE PLATE

BACKGROUND OF THE INVENTION

1. Field of the Invention

This invention relates to a liquid level detection apparatus suited for detecting a liquid level (or height) within a fuel tank of an automobile, and more particularly to an improved resistance plate used in a liquid level detection apparatus in which a float arm connected at its distal end to a float is pivotally moved in accordance with displacement of the float floating on the liquid surface, and a sliding arm slides over the resistance plate in accordance with the pivotal movement of the float arm.

2. Related Art

One conventional liquid level detection apparatus disclosed in Japanese Patent No. 3,833,551 Specification will be described with reference to FIG. 6. As shown in FIG. 6, the liquid level detection apparatus 100 includes a resistance plate 101, and a sliding arm 102 for sliding over this resistance plate 101 in accordance with a pivotal movement of a float arm (not shown). A first slide portion 103 and a second slide portion 104 each comprising an electrically-conductive layer of excellent conductivity are formed on an insulating layer of the resistance plate 101. The first slide portion 103 includes a plurality of first conductive segments 105 arranged at intervals in a direction of sliding movement of the sliding arm 102, and the adjacent first conductive segments 105 are connected together via a resistor 106. The second slide portion 104 includes a plurality of second conductive segments 107 arranged at intervals in the direction of sliding movement of the sliding arm 102, and the adjacent second conductive segments 107 are conductively connected together via a conductive member made of the same material as that of the second conductive segments 107. End lands 110a and 110b are provided respectively at one ends of the first and second slide portions 103 and 104, and a detection output can be obtained between the two end lands 110a and 110b.

The sliding arm 102 is formed of an electrically conductive material, and includes a first contact portion 120 for sliding over the first slide portion 103, and a second contact portion 121 for sliding over the second slide portion 104. The first slide portion 103 and the second slide portion 104 are electrically connected together via this sliding arm 102.

In the above construction, when the sliding arm 102 slides in accordance with the liquid level, the first contact portion 120 and the second contact portion 121 slide respectively over the first slide portion 103 and the second slide portion 104, and the first contact portion 120 contacts one of the first conductive segments 105 of the first slide portion 103, while the second contact portion 121 contacts one of the second conductive segments 107 of the second slide portion 104. A main resistance of an electric circuit formed by the first slide portion 103, the sliding arm 102 and the second slide portion 104 is a resistance of the resistor 105 lying between the end land 110a of the first slide portion 103 and the first conductive segment 105 with which the first contact portion 120 is contacted, and therefore a quantity of electricity corresponding to the sliding position of the sliding arm 102, that is, corresponding to the position of the liquid level, is obtained between the two end lands 110a and 110b.

Here, when the first contact portion 120 of the sliding arm 102 contacting an arbitrary one of the first conductive segments 105 shifts into contact with its adjacent first conductive segment 105, the quantity of the resistance of the resistor 106 between the adjacent first conductive segments 105 increases or decreases in a stepping manner, and therefore a variation in the liquid level can be detected as a fine step-like change.

Incidentally, the above liquid level detection apparatus 100 is required to have a high precision, and in order to meet this requirement, the following processing has heretofore been applied to the resistance plate 101. Namely, the resistance plate 101, having the resistor 106 beforehand formed into a low resistance value, is produced, and the sliding arm 102 is attached to this resistance plate 101. Then, a closed circuit is formed between the end lands 110a and 110b of the first and second slide portions 103 and 104, utilizing the sliding arm 102 as shown in FIG. 6, and there is effected a trimming operation in which notches a are formed in the resistor 106 at regions between the first conductive segments 105 by a laser, thereby adjusting the resistance value, and by doing so, the resistor 106 between the adjacent first conductive segments 105 is formed into a desired resistance value.

At the time when the liquid level detection apparatus 100 of the above construction is mounted on an automobile so as to detect a liquid level (or height) of fuel within a fuel tank, end portions of conductors of wires from a detector (not shown) are fixed respectively to the end lands 110a and 110b of the resistance plate 101 by soldering in electrically connected relation thereto. Incidentally, in the resistance plate 101, the end land 110a serves as a plus (+) terminal, while the end land 110b serves as a minus (−) terminal, that is, a ground (GND) terminal. As described above, the liquid level detection apparatus 100 is so constructed that the detection output can be obtained between the end lands 110a and 110b of the resistance plate 101, and when the detector (not shown) obtains this detection output, a direct current flows from the end land 110a to the end land 110b, and therefore a potential difference develops between the end land 110a and the end land 110b.

Incidentally, the above liquid level detection apparatus 100 is often used in a fuel tank of an automobile for holding as fuel an electrolyte (alcohol) (such as ethanol and methanol) itself or gasoline containing such electrolyte. Naturally, there are occasions when the fuel is brought into contact with that surface of the resistance plate 101 contacting the sliding arm 102 as when the resistance plate 101 is immersed in the fuel. In the resistance plate 101, needless to say, that portion thereof which is the largest in the potential difference toward the plus (+) side relative to the end land 110b (serving as the minus terminal) is the end land 110a. That portion of the resistance plate 101 which is the next largest in the potential difference toward the plus (+) side to the end land 110a to which soldering and coating are applied is a portion 111 (indicated by hatching) of the conductive layer extending between the end land 110a and the first conductive segment 105 closest to the end land 110a. Therefore, this portion 111 is liable to be most affected by electrolysis occurring as when the resistance plate is immersed in the fuel, and there is a high possibility that this portion 111 may be deteriorated and corroded. The potential difference between the end land 110a and the end land 110b logarithmically affects the degree of electrolysis.

SUMMARY OF THE INVENTION

This invention has been made in view of the above circumstances, and an object of the invention is to provide a resistance plate which can alleviate the influence of electrolysis occurring as when the resistance plate is immersed in an electrolyte, and besides can be produced at a relatively low cost, and also to provide a liquid level detection apparatus provided with this resistance plate.

The above object has been achieved by a resistance plate of the present invention having features recited in the following Paragraph (1) to (5).

(1) A resistance plate for use in a liquid level detection apparatus comprising a float for moving upward and downward in accordance with a change of a liquid level to be measured, a float arm connected at one end thereof to the float and pivotally supported at the other end thereof so as to be pivotally moved in accordance with upward and downward movements of the float, the resistance plate, and a sliding arm for sliding over the resistance plate in accordance with a pivotal movement of the float arm; characterized in that:

the resistance plate includes:

a first slide portion having a plurality of first conductive segments arranged at intervals generally in a direction of sliding movement of the sliding arm, the adjacent first conductive segments being connected together via a resistor;

a second slide portion extending generally in the direction of sliding movement of the sliding arm;

a pair of first and second end lands which are provided for detecting a quantity of electricity appearing according to the positions of the first conductive segment and a portion of the second slide portion which are held in contact with the sliding arm, the first and second end lands being electrically connected respectively to the first slide portion and the second slide portion;

a first conducting path extending between the first slide portion and the first end land to electrically connect the first slide portion and the first end land together; and a protector formed on the first conducting path to cover the first conducting path; and the first end land serves as a plus (+) terminal while the second end land serves as a minus (−) terminal, and the protector and the resistor are made of the same material.

(2) The resistance plate of the above Paragraph (1) is characterized in that the protector and the resistor are made of ruthenium oxide.

(3) The resistance plate of the above Paragraph (1) or Paragraph (2) is characterized in that the protector and the resistor are formed integrally with each other.

(4) The resistance plate of any one of the above Paragraphs (1) to (3) is characterized in that the resistance plate further includes:

a second conducting path extending between the second slide portion and the second end land to electrically connect the second slide portion and the second end land together; and a second protector formed on the second conducting path to cover the second conducting path; and the second protector is made of the same material as that of the resistor.

(5) The resistance plate of any one of the above Paragraphs (1) to (4) is characterized in that the resistor is formed on other area of the first slide portion than a slide area thereof over which the sliding arm slides.

In the resistance plate of the above Paragraph (1), the first conducting path extends between the first end land (serving as the plus (+) terminal for detecting the quantity of electricity appearing according to the positions of the first conductive segment and the portion of the second slide portion which are held in contact with the sliding arm) and the first slide portion to electrically connect the first end land and the first slide portion together, and the protector is formed on the first conducting path to cover the same. Therefore, in the resistance plate of the above Paragraph (1), the influence of electrolysis occurring as when the resistance plate is immersed in an electrolyte can be alleviated. Furthermore, in the resistance plate of the above Paragraph (1), the material forming the resistor is the same as the material forming the protector, and therefore a common printing mask can be used when forming the resistor and the protector, and therefore the resistor and the protector 14 can be formed simultaneously, so that the time required for producing the resistance plate can be reduced. Therefore, in the resistance plate of the above Paragraph (1), when forming the protector, a material different from the material of the resistor is not used, and therefore the increase of the cost can be kept to a minimum.

In the resistance plate of the above Paragraph (2), the protector and the resistor are made of ruthenium oxide which is less liable to be deteriorated and corroded by electrolysis (in other words, the electrolysis is less liable to occur) even when it is exposed to alcohol (electrolyte) such as ethanol and methanol. Therefore, the protector can prevent the electrolysis from occurring at the first conducting path. Even in a non-energized condition, alcohol (electrolyte) such as ethanol and methanol corrodes metal, but the first conducting path is covered with the protector, and therefore will not be deteriorated and corroded.

There is no problem even when the resistor and the protector are formed integrally with each other as in the resistance plate of the above Paragraph (3), and this is rather advantageous in that the resistor and the protector can be formed more easily.

In the resistance plate of the above Paragraph (4), the second conducting path extends between the second end land (serving as the minus (−) terminal) and the second slide portion, and the second protector is formed on the second conducting path to cover the same, and the second protector is made of the same material as that of the resistor. Therefore, advantages similar to those of the above Paragraph (1) can be obtained, and even in a non-energized condition, the second conducting path will not be deteriorated and corroded by alcohol (electrolyte).

In the resistance plate of the above Paragraph (5), the resistor is formed on other area of the first slide portion than the slide area thereof over which the sliding arm slides. With this construction, a resistance of contact between the sliding arm and the first conductive segments is prevented from increasing.

The above object has also been achieved by a liquid level detection apparatus having features recited in the following Paragraph (6)

(6) A liquid level detection apparatus characterized in that the apparatus comprises:

a resistance plate as defined in any one of claims 1 to 5;

a float for moving upward and downward in accordance with a change of a liquid level to be measured;

a float arm connected at one end thereof to the float and pivotally supported at the other end thereof so as to be pivotally moved in accordance with upward and downward movements of the float; and a sliding arm for sliding over the resistance plate in accordance with a pivotal movement of the float arm corresponding to the liquid level; and the sliding arm includes a first contact portion for sliding over the first slide portion of the resistance plate, and a second contact portion for sliding over the second slide portion of the resistance plate; and the first contact portion and the second contact portion respectively contact the first conductive segment of the first slide portion and a portion of the second slide portion which correspond to each other; and a quantity of electricity, appearing between the first end land of the first slide portion and the second end land of the second slide portion according to the positions of the first conductive segment and the portion of the second slide portion which are held in contact with the sliding arm, is detected and outputted.

In the liquid level detection apparatus of the above Paragraph (6), excellent advantages similar to those of the above Paragraphs (1) to (5) can be achieved.

In the present invention, there can be provided the resistance plate which can alleviate the influence of electrolysis occurring as when the resistance plate is immersed in an electrolyte, and besides can be produced at a relatively low cost, and also there can be provided the liquid level detection apparatus provided with this resistance plate.

The present invention has been briefly described above, and details of the invention will become more manifest upon reading the following Section "DETAILED DESCRIPTION OF THE PREFERRED EMBODIMENTS" with reference to the accompanying drawings.

DETAILED DESCRIPTION OF THE PREFERRED EMBODIMENTS

A preferred embodiment of the present invention will now be described in detail with reference to the drawings.

Figure 1:
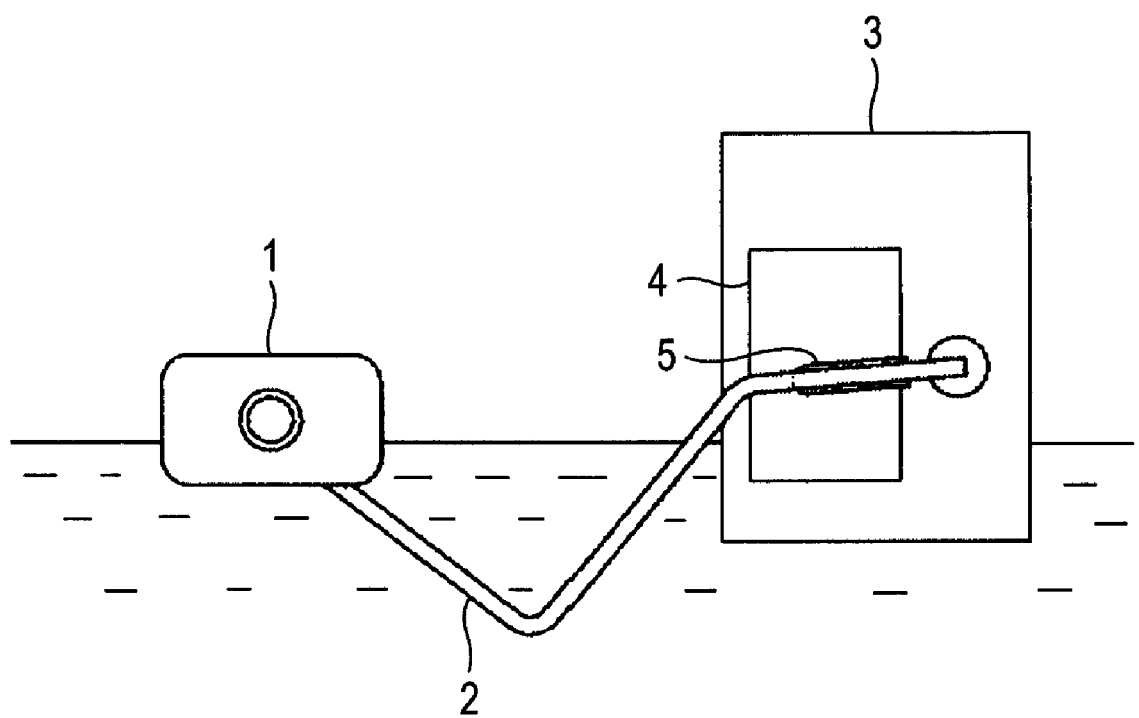
FIG. 1 shows one preferred embodiment of the present invention, and is a view broadly showing the construction of a liquid level detection apparatus.
Figure 2:
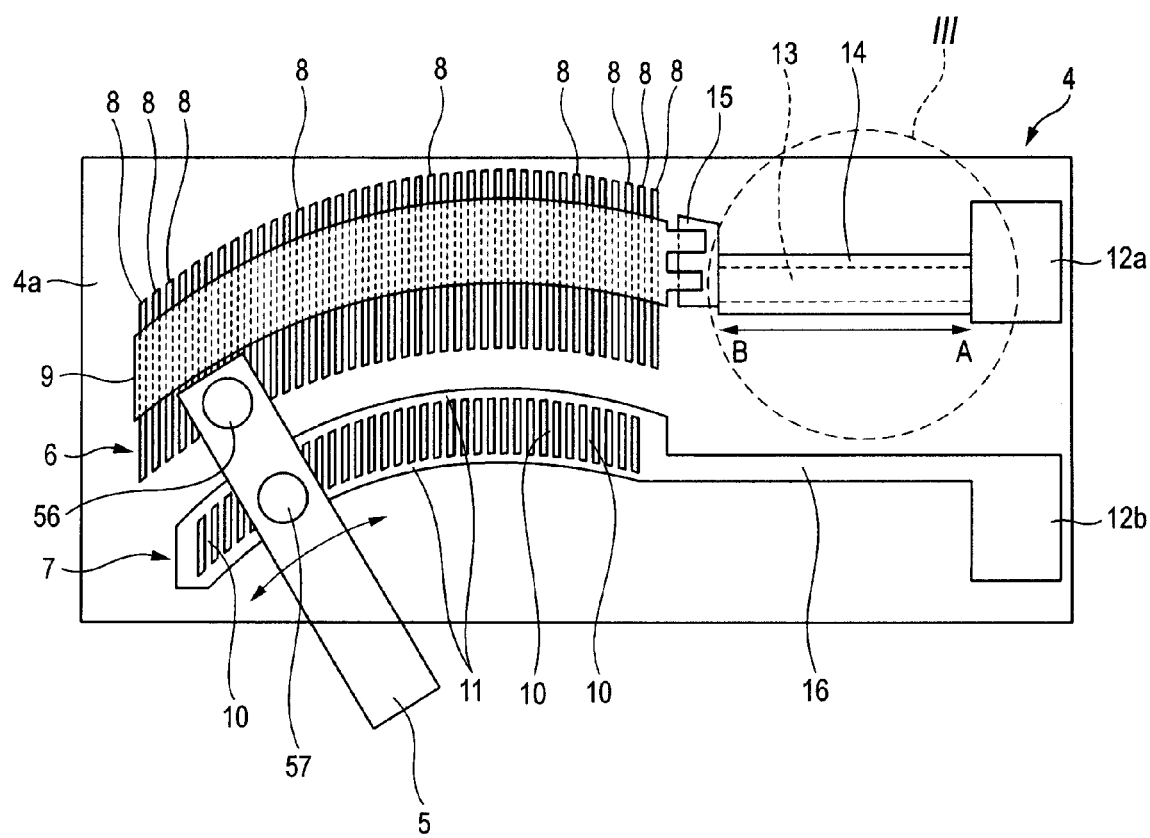
FIG. 2 shows the preferred embodiment of the invention, and is a plan view explanatory of a resistance plate used in the liquid level detection apparatus of FIG. 1.
Figure 3:
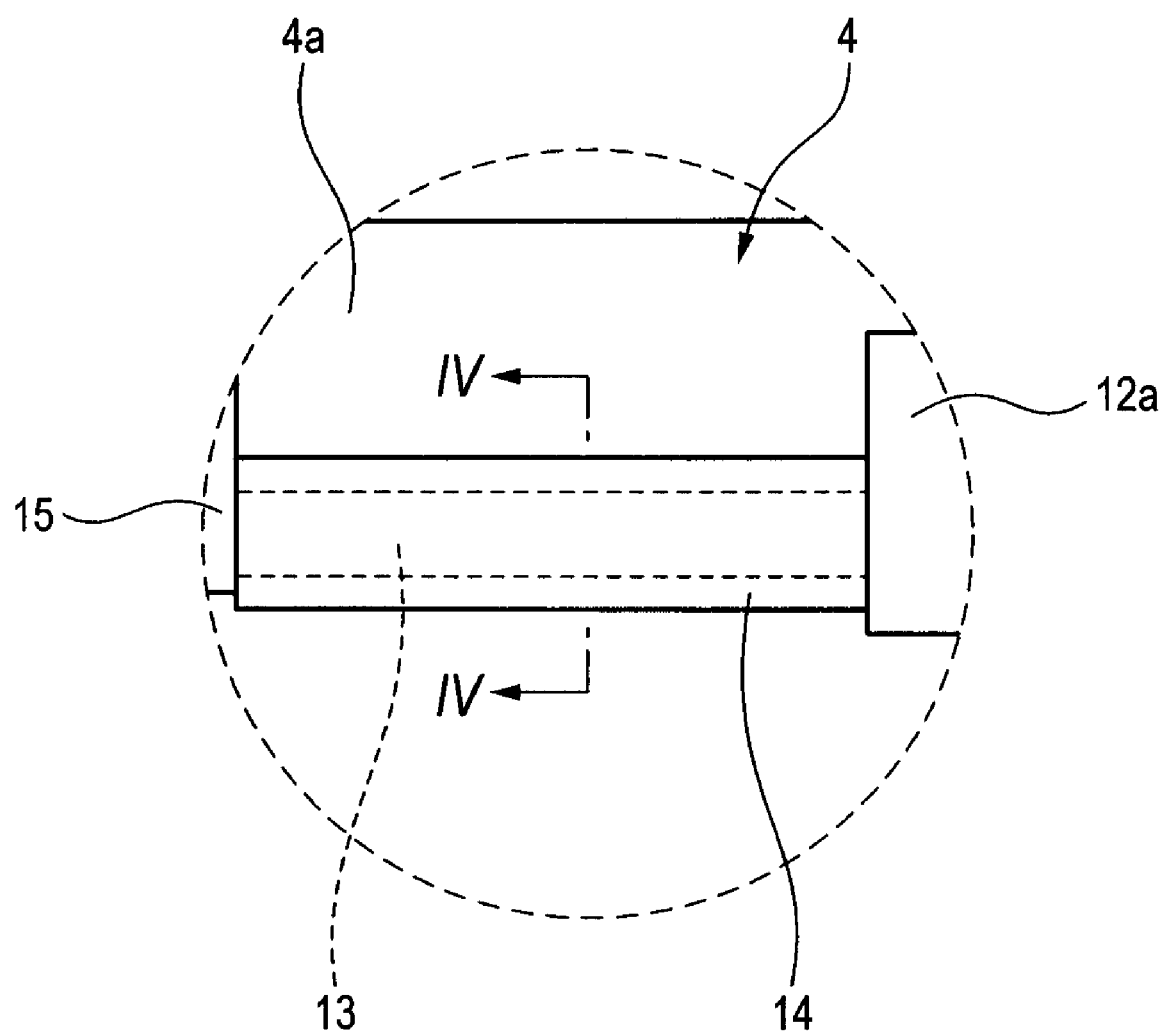
FIG. 3 is an enlarged view of a portion of FIG. 2 encircled by a broken line III.
Figure 4:
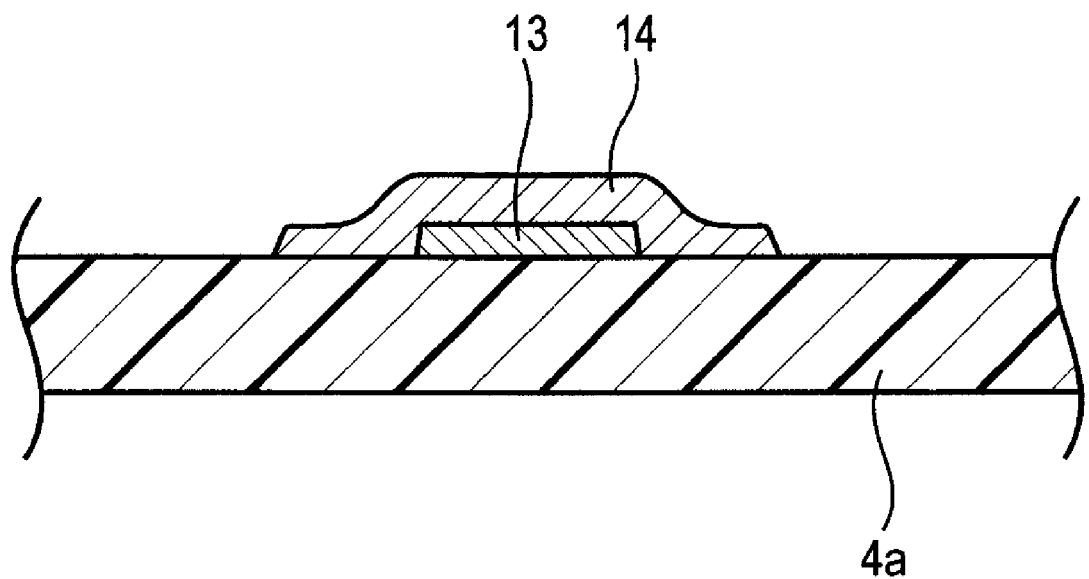
FIG. 4 is a cross-sectional view taken along the line IV-IV of FIG. 3.

FIGS. 1 to 4 show one preferred embodiment of the invention, and FIG. 1 is a view broadly showing the construction of a liquid level detection apparatus, FIG. 2 is a plan view explanatory of a resistance plate used in the liquid level detection apparatus of FIG. 1, FIG. 3 is an enlarged view of a portion of FIG. 2 encircled by a broken line III, and FIG. 4 is a cross-sectional view taken along the line IV-IV of FIG. 3.

The liquid level detection apparatus of the invention is mounted on an automobile in order to detect a liquid level (or height) of fuel within a fuel tank. As shown in FIG. 1, this liquid level detection apparatus comprises a float 1 for moving upward and downward in accordance with a change of the liquid level to be measured, a float arm 2, a detection apparatus body 3, the resistance plate 4, a sliding arm 5, and a detector (see reference numeral 70 in FIG. 5). More specifically, the float 1 floating on the liquid surface of the fuel within the fuel tank is pivotally supported on a distal end of the float arm 2, and a proximal end of this float arm 2 is pivotally supported on the detection apparatus body 3. Also, the resistance plate 4 and the sliding arm 5 for sliding over the resistance plate 4 in accordance with the pivotal movement of the float arm 2 are provided at the detection apparatus body 3.

As shown in FIG. 2, a generally arc-shaped first slide portion 6 and a generally arc-shaped second slide portion 7 are formed on one side of an insulating layer 4a of the resistance plate 4, these slide portions 6 and 7 being formed as part of an electrically-conductive layer made of silver palladium which has excellent electrical conductivity and also is excellent in deterioration resistance and corrosion resistance.

The first slide portion 6 includes a plurality of first conductive segments 8. These first conductive segments 8 are arranged at intervals in a direction of sliding movement of the sliding arm 5, and opposite ends of the first slide portion 6 spaced from each other in a longitudinal direction are disposed such that the plurality of first conductive segments 8 assume a generally arc-shape. A resistor 9 is formed on the plurality of first conductive segments 8, and intersects a longitudinal axis of each first conductive segment 8 (that is, extends in a direction of juxtaposition of the first conductive segments 8). The resistor 9 is a resistance layer made of ruthenium oxide which is more excellent in sulfur resistance than silver palladium and besides is less liable to be deteriorated and corroded by electrolysis even when it is exposed to alcohol (electrolyte) such as ethanol and methanol.

The adjacent first conductive segments 8 are connected together via the resistor 9. The resistor 9 covers other area of the first slide portion 6 than a slide area thereof over which the sliding arm 5 slides. The reason for this is that if the resistor 9 covers this slide area, a resistance of contact between a first contact portion 56 of the sliding arm 6 and the first conductive segments 8 increases. Incidentally, there may be effected a trimming operation as described above, in which notches are formed in the resistor 9 at regions between the first conductive segments 8 by a laser, thereby adjusting a resistance value, and by doing so, the resistor 106 between the adjacent first conductive segments 105 is formed into a desired resistance value.

The second slide portion 7 includes a plurality of second conductive segments 10. These second conductive segments 10 are arranged at intervals in the direction of sliding movement of the sliding arm 5, and assume a generally arc-shape. The adjacent second conductive segments 10 are electrically connected together in a short-circuiting manner by generally arc-shaped conductive interconnecting portions 11.

An end land 12a forming part of the above-mentioned conductive layer is provided in spaced, opposed relation to one end of the juxtaposed first conductive segments 8. Also, an end land 12b forming part of the above-mentioned conductive layer is provided in spaced, opposed relation to one end of the juxtaposed second conductive segments 10. End portions of conductors of wires from the detector (see reference numeral 70 in FIG. 5) are fixed respectively to the end lands 12a and 12b of the resistance plate 4 by soldering in electrically connected relation thereto.

Incidentally, in the resistance plate 4, the end land 12a serves as a plus (+) terminal, while the end land 12b serves as a minus (−) terminal, that is, a ground (GND) terminal. The resistance plate 4 is so constructed that a detection output can be obtained between the end lands 12a and 12b, and when the detector (see reference numeral 70 in FIG. 5) obtains this detection output, a direct current flows from the end land 12a to the end land 12b, and therefore a potential difference develops between the end land 12a and the end land 12b.

The sliding arm 5 is similar to the sliding arm of the above-mentioned conventional apparatus, and is formed of an electrically conductive material, and includes the first contact portion 56 for sliding over the first slide portion 6, and a second contact portion 57 for sliding over the second slide portion 7. The first contact portion 56 of the sliding arm 5 contacts the corresponding first conductive segment 8, while the second contact portion 57 of the sliding arm 5 contacts the corresponding second conductive segment 10, so that the first slide portion 6 and the second slide portion 7 are electrically connected together via the sliding arm 5.

In the resistance plate 4, needless to say, that portion thereof which is the largest in the potential difference toward the plus (+) side relative to the end land 12$b$ (serving as the minus terminal) is the end land 12$a$. That portion of the resistance plate 4 which is the next largest in the potential difference toward the plus (+) side to the end land 12$a$ to which soldering and coating are applied is a first conducting path 13 extending between the end land 12$a$ and the first conductive segment 8 closest to the end land 12$a$.

As shown in FIG. 2, the first conducting path 13 is that portion of the above-mentioned conductive layer extending between a region B and a region A. In short, the first conducting path 13 is the portion of the above conductive layer extending continuously between a resistor end connecting land 15 of the first slide portion 6 (electrically connected to the resistor 9 which determines the resistance value) and the end land 12$a$. Incidentally, the resistance plate 4 also has a second conducting path 16 extending continuously between the end land 12$b$ and the end of the second slide portion 7 close to the end land 12$b$, and this second conducting path 16 is also part of the above conductive layer.

In the resistance plate 4, a protector 4 is formed on the first conducting path 13 to cover this first conducting path 13 as shown in FIGS. 2 to 4. The protector 14 is made of the same material as that of the resistor 9. Namely, this protector 14 is also a resistance layer made of ruthenium oxide which is more excellent in sulfur resistance than silver palladium and besides is less liable to be deteriorated and corroded by electrolysis (in other words, the electrolysis is less liable to occur) even when it is exposed to alcohol (electrolyte) such as ethanol and methanol. Therefore, the protector 14 can prevent the electrolysis from occurring at the first conducting path 13.

Incidentally, with respect to the formation of a circuit pattern on the resistance plate 4, the above conductive layer (that is, the first slide portion 6, the first conducting path 13, the end land 12$a$, the second slide portion 7, the second conducting path 16, the end land 12$b$, etc.) is formed on the insulating layer 4$a$ by screen printing or the like, and then the resistance layers (that is, the resistor 9, the protector 14, etc.) are further formed by screen printing or the like.

Here, the material forming the resistor 9 is the same as the material forming the protector 14, and therefore a common printing mask can be used when forming these resistance layers, and therefore the resistor 9, the protector 14, etc., can be formed simultaneously, and therefore the time required for producing the resistance plate 4 can be reduced. Thus, when forming the protector 14, a material different from the material of the resistor 9 is not used, and therefore the increase of the cost can be kept to a minimum. Even in a non-energized condition, alcohol (electrolyte) such as ethanol and methanol corrodes metal, but the first conducting path 13 of the resistance plate 4 is covered with the protector 14, and therefore will not be deteriorated and corroded.

The deterioration and corrosion can be prevented, for example, by a construction in which the surface of the conductive layer (including the first conducting path 13) is covered with other resistance layer or an insulating layer. In this case, however, a material different from the material of the resistor 9 is needed, and therefore the number of steps of the process of forming the circuit pattern on the resistance plate 4 increases, so that the cost is inevitably much increased.

The present invention is not limited to the above embodiment, and suitable modifications and improvements can be made. Furthermore, the material, shape, dimensions, numerical value, form, number, disposition, etc., of each of the constituent elements of the above embodiment are arbitrary and are not limited in so far as the invention can be achieved.

Figure 6:
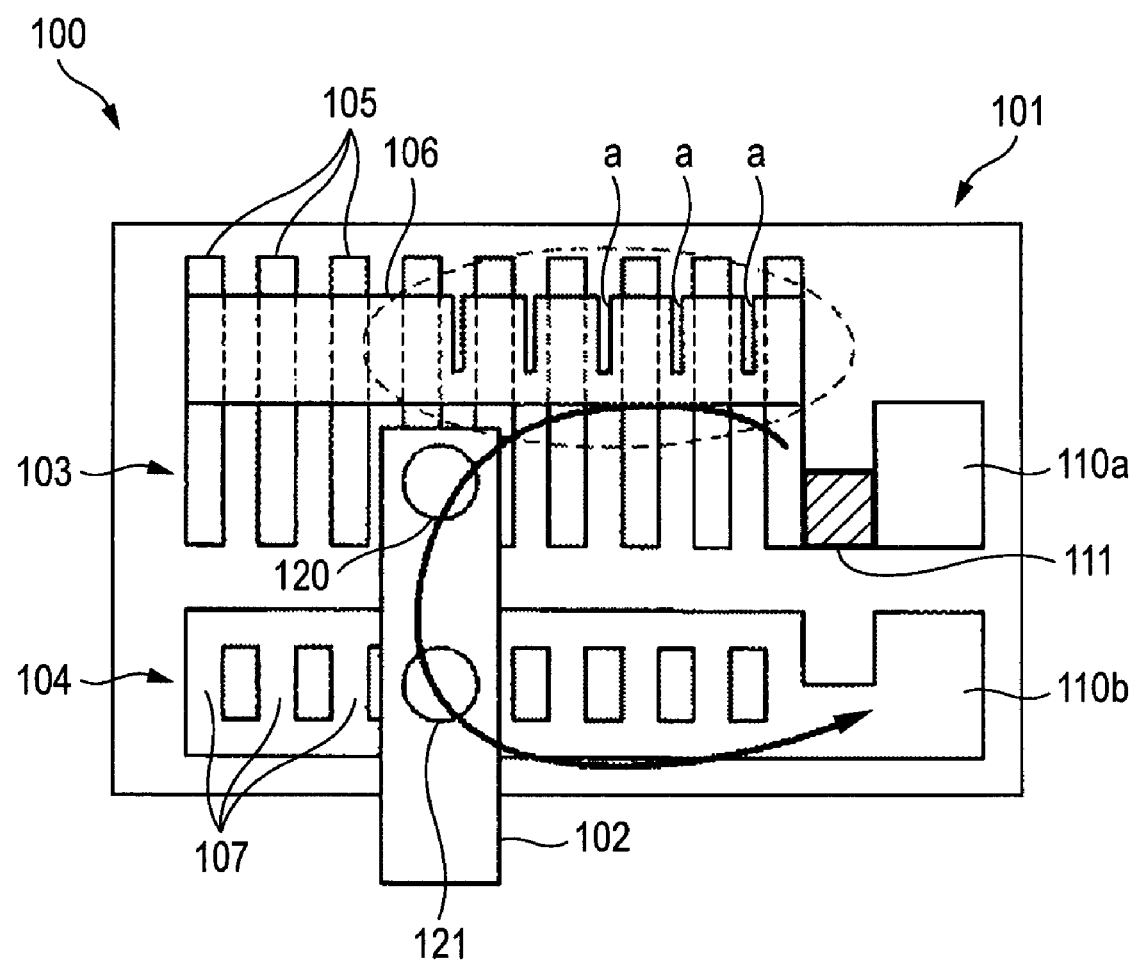
FIG. 6 is a view explanatory of a resistance plate used in a conventional liquid level detection apparatus.

For example, the present invention can be applied to the conventional resistance plate 101 of FIG. 6. Namely, a protector is formed on the portion 111 of the conductive layer extending between the end land 110$a$ and the first slide portion 103 (that is, the first conductive segment 105 closest to the end land 110$a$), and covers this portion 111. In this case, also, the protector is made of the same material as that of the resistor 106.

Furthermore, in the embodiment shown in FIG. 2, although the resistor 9 and the protector 14 are formed separately from each other, the resistor 9 and the protector 14 can be formed integrally with each other (that is, formed in continuous relation to each other), in which case there is no problem.

Furthermore, a protector may be formed on the second conducting path 16 to cover this second conducting path 16. In this case, also, for the reasons mentioned above, a material of the protector covering the second conducting path 16 is preferably the same as the material of the resistor 9 and the protector 14.

In the above embodiment, ruthenium oxide is used as the material of the resistance layers (that is, the resistor 19, the protector 14, etc.). A resin or glass may be coated on the resistance layers to cover the same although this increases the cost. In this case, a printing process for forming a resin layer or a glass layer after the formation of the resistance layers is further required.

Furthermore, in the above embodiment, the second slide portion 7 includes the plurality of second conductive segments 10 arranged at intervals generally in the direction of sliding movement of the sliding arm 5, and the conductive interconnecting portions 11 electrically connecting the adjacent second conductive segments 10. However, the second slide portion 7 is not limited to such a ladder-like shape, and instead, there can be used a second slide portion which is flat and has no slit.

Figure 5:
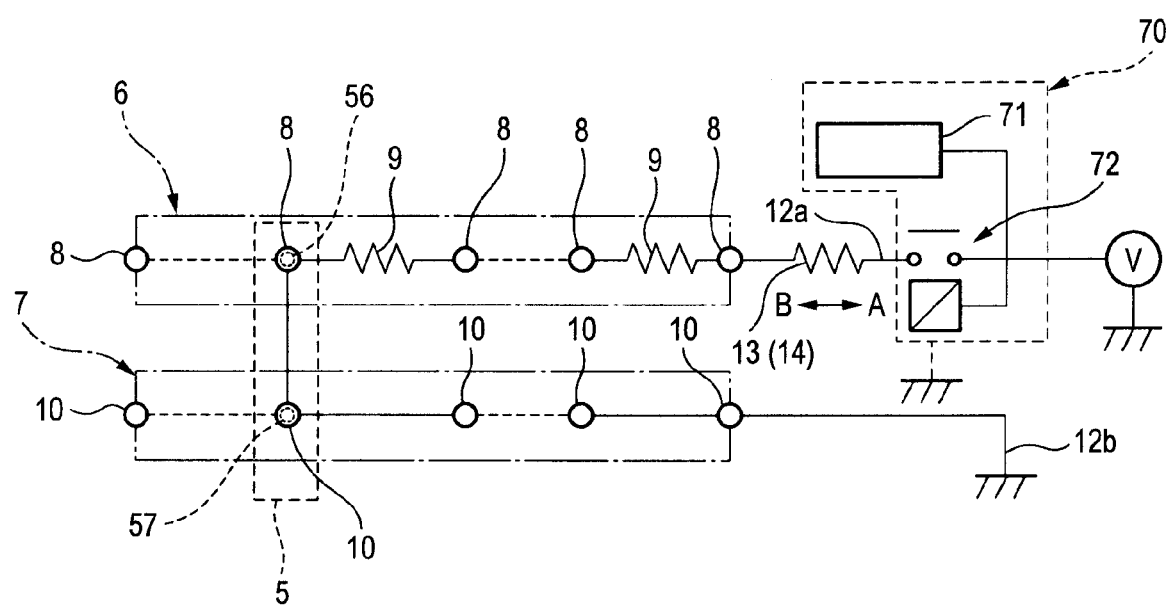
FIG. 5 is an equivalent circuit diagram showing in a simplified manner an electric circuit formed on an insulating layer of the resistance plate of FIG. 2 as well as one example of a detector electrically connected to the electric circuit.

Furthermore, by combining the intermittent energization disclosed in JP-A-63-138215 with this embodiment, more excellent effects against the electrolysis can be achieved. Namely, for example, in a detector 70 conductively connected to end lands 12$a$ and 12$b$, a switching circuit 71 supplies a predetermined on/off signal to a reed relay 72 as shown in FIG. 5, and according to this on/off signal, an end land (12$a$)-side contact and a power supply-side contact of the reed relay 72 are conductively connected and disconnected by a contact piece, thereby suppressing the electrolysis at a resistance plate 4. In FIG. 5, the constituent elements of the above embodiment are designated by the identical reference numerals, respectively, and detail description thereof will be omitted.

What is claimed is:

1. A resistance plate for use in a liquid level detection apparatus comprising a float for moving upward and downward in accordance with a change of a liquid level to be measured, a float arm connected at one end thereof to said float and pivotally supported at the other end thereof so as to be pivotally moved in accordance with upward and downward movements of said float, said resistance plate, and a sliding arm for sliding over said resistance plate in accordance with a pivotal movement of said float arm;

wherein said resistance plate includes:

a first slide portion having a plurality of first conductive segments arranged at intervals generally in a direction of sliding movement of said sliding arm, the adjacent first conductive segments being connected together via a resistor;

a second slide portion extending generally in the direction of sliding movement of said sliding arm;

a pair of first and second end lands which are provided for detecting a quantity of electricity appearing according to the positions of said first conductive segment and a portion of said second slide portion which are held in contact with said sliding arm, said first and second end lands being electrically connected respectively to said first slide portion and said second slide portion;

a first conducting path extending between said first slide portion and said first end land to electrically connect said first slide portion and said first end land together; and a protector formed on said first conducting path to cover said first conducting path; and said first end land serves as a plus terminal while said second end land serves as a minus terminal, and said protector and said resistor are made of the same material.

2. A resistance plate according to claim 1, wherein said protector and said resistor are made of ruthenium oxide.

3. A resistance plate according to claim 1, wherein said protector and said resistor are formed integrally with each other.

4. A resistance plate according to claim 1, wherein said resistance plate further includes:

a second conducting path extending between said second slide portion and said second end land to electrically connect said second slide portion and said second end land together; and a second protector formed on said second conducting path to cover said second conducting path; and said second protector is made of the same material as that of said resistor.

5. A resistance plate according to claim 1, wherein said resistor is formed on other area of said first slide portion than a slide area thereof over which said sliding arm slides.

6. A liquid level detection apparatus comprising:

a resistance plate as defined in claim 1;

a float for moving upward and downward in accordance with a change of a liquid level to be measured;

a float arm connected at one end thereof to said float and pivotally supported at the other end thereof so as to be pivotally moved in accordance with upward and downward movements of said float; and a sliding arm for sliding over said resistance plate in accordance with a pivotal movement of said float arm corresponding to the liquid level; and said sliding arm includes a first contact portion for sliding over said first slide portion of said resistance plate, and a second contact portion for sliding over said second slide portion of said resistance plate; and said first contact portion and said second contact portion respectively contact said first conductive segment of said first slide portion and a portion of said second slide portion which correspond to each other; and a quantity of electricity, appearing between said first end land of said first slide portion and said second end land of said second slide portion according to the positions of said first conductive segment and the portion of said second slide portion which are held in contact with said sliding arm, is detected and outputted.

* * * * *